(12) United States Patent
Aoki

(10) Patent No.: US 9,890,730 B2
(45) Date of Patent: Feb. 13, 2018

(54) AIR-FUEL RATIO DETECTION DEVICE AND AIR-FUEL RATIO DETECTION METHOD

(75) Inventor: Keiichiro Aoki, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 768 days.

(21) Appl. No.: 14/360,092

(22) PCT Filed: Nov. 24, 2011

(86) PCT No.: PCT/JP2011/077054
§ 371 (c)(1),
(2), (4) Date: May 22, 2014

(87) PCT Pub. No.: WO2013/076842
PCT Pub. Date: May 30, 2013

(65) Prior Publication Data
US 2014/0316678 A1  Oct. 23, 2014

(51) Int. Cl.
*F02D 41/22* (2006.01)
*F02D 41/14* (2006.01)
(Continued)

(52) U.S. Cl.
CPC ............. *F02D 41/22* (2013.01); *F01N 3/101* (2013.01); *F01N 9/00* (2013.01); *F02D 41/1441* (2013.01);
(Continued)

(58) Field of Classification Search
CPC .. F02D 41/22; F02D 41/1456; F02D 41/1441; F01N 9/00; F01N 3/101;
(Continued)

(56) References Cited

U.S. PATENT DOCUMENTS 5,137,615 A * 8/1992 Friese ................ G01N 27/4071
204/410
5,400,592 A * 3/1995 Mukaihira ............ F01N 11/007
123/674

(Continued)

FOREIGN PATENT DOCUMENTS

JP         05171923 A  *  7/1993
JP       11-093744 A       4/1999

(Continued)

*Primary Examiner* — Sizo Vilakazi
*Assistant Examiner* — Brian Kirby
(74) *Attorney, Agent, or Firm* — Andrews Kurth Kenyon LLP

(57) ABSTRACT

When an air-fuel ratio detection performed by detecting an output of a downstream sensor, which is a limiting-current type air-fuel ratio sensor arranged at a downstream side of a catalyst in an exhaust passage of an internal combustion engine, and calculating an air-fuel ratio at the downstream side of the catalyst in accordance with the output, if the output is within a predetermined range including an output corresponding to a theoretical air-fuel ratio, a relationship between the output and an air-fuel ratio that is calculated by calculation means is shifted more to a rich side relative to a correspondence relationship between an output of an upstream sensor, which is a similar sensor to the downstream sensor arranged at an upstream side of the catalyst in the exhaust passage of the engine, and an air-fuel ratio.

4 Claims, 6 Drawing Sheets

(51) Int. Cl.
*F01N 3/10* (2006.01)
*F01N 9/00* (2006.01)
*F02M 17/08* (2006.01)

(52) U.S. Cl.
CPC .... *F02D 41/1456* (2013.01); *F01N 2560/025* (2013.01); *F01N 2900/0408* (2013.01); *F01N 2900/0416* (2013.01); *F02M 17/08* (2013.01); *Y02T 10/22* (2013.01); *Y02T 10/47* (2013.01)

(58) Field of Classification Search
CPC ....... F01N 2900/0408; F01N 2560/025; F01N 2900/0416; Y02T 10/47; F02M 17/08
USPC ........................................................ 701/103
See application file for complete search history.

(56) References Cited

U.S. PATENT DOCUMENTS

| | | | | |
|---|---|---|---|---|
| 5,528,899 A * | 6/1996 | Ono | ................ | F02D 41/1441 60/276 |
| 5,648,601 A * | 7/1997 | Katoh | ................ | G01N 33/007 73/1.06 |
| 5,845,489 A * | 12/1998 | Dohta | ................ | F01N 11/00 123/688 |
| 5,970,707 A * | 10/1999 | Sawada | ............ | B01D 53/9454 123/691 |
| 6,021,758 A * | 2/2000 | Carey | ................ | F02D 41/0085 123/406.24 |
| 2001/0045089 A1 | 11/2001 | Kobayashi et al. | | |
| 2002/0139360 A1 * | 10/2002 | Sato | ................ | F02D 41/0037 123/698 |
| 2003/0017603 A1 | 1/2003 | Uchida et al. | | |
| 2004/0217001 A1 * | 11/2004 | Hada | ................ | G01N 27/4071 204/424 |
| 2005/0284759 A1 | 12/2005 | Kawase et al. | | |
| 2007/0187240 A1 * | 8/2007 | Araya | ................ | F01N 11/00 204/424 |
| 2007/0261960 A1 * | 11/2007 | Aoki | ................ | F02D 41/1454 204/427 |
| 2008/0066727 A1 * | 3/2008 | Kato | ................ | F02D 41/2461 123/703 |
| 2009/0019834 A1 | 1/2009 | Aoki | | |
| 2010/0132681 A1 * | 6/2010 | Okazaki | ............. | F02D 41/1441 123/703 |
| 2010/0307135 A1 * | 12/2010 | Miyamoto | ............. | F01N 11/00 60/277 |
| 2011/0192146 A1 * | 8/2011 | Sugimoto | ............. | F02D 41/0085 60/276 |
| 2011/0282541 A1 * | 11/2011 | Kidokoro | ............. | F02D 41/0085 701/31.4 |
| 2012/0209498 A1 * | 8/2012 | Aoki | ................ | F02D 41/1454 701/103 |

FOREIGN PATENT DOCUMENTS

| | | | | |
|---|---|---|---|---|
| JP | 2001-234789 A | 8/2001 | | |
| JP | 2003-097334 A | 4/2003 | | |
| JP | 2005133620 A | 5/2005 | | |
| JP | 2005-248914 A | 9/2005 | | |
| JP | 2006-002579 A | 1/2006 | | |
| JP | 2006-010583 A | 1/2006 | | |
| JP | 2006-291893 A | 10/2006 | | |
| JP | 2007-032438 A | 2/2007 | | |
| JP | 2009-024613 A | 2/2009 | | |
| JP | WO2010087026 A1 * | 8/2010 | ......... | F02D 41/0085 |
| JP | WO 2010087026 A1 * | 8/2010 | ......... | F02D 41/0085 |
| WO | WO2010087026 A1 * | 8/2010 | ......... | F02D 41/0085 |

* cited by examiner

| GA[g/s] \ AFI [mA] | -0.6 | -0.4 | -0.2 | 0 | 0.2 | 0.4 | 0.6 |
| --- | --- | --- | --- | --- | --- | --- | --- |
| 10 | 12 | 13 | 14 | 14.2 | 14.6 | 16 | 18 |
| 20 | 12 | 13.1 | 14.1 | 14.3 | 14.8 | 16.1 | 18 |
| 30 | 12 | 13.1 | 14.2 | 14.4 | 14.9 | 16.1 | 18 |
| 40 | 12 | 13.1 | 14.3 | 14.5 | 15 | 16.1 | 18 |
| 50 | 12 | 13.1 | 14.4 | 14.6 | 15 | 16.1 | 18 |
Fig. 7
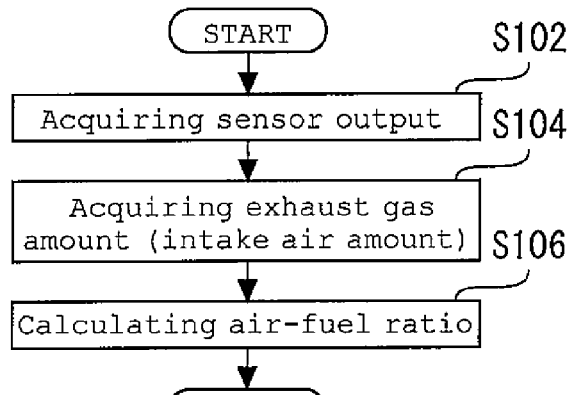
Fig. 8
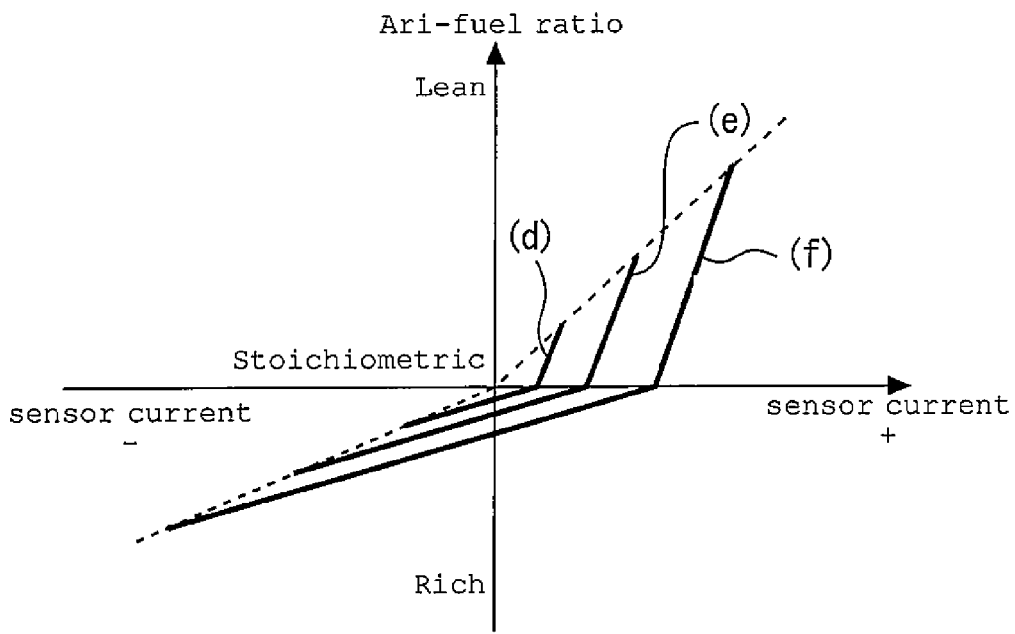
Fig. 9

| AFI [mA] TEXS[°C] | -0.6 | -0.4 | -0.2 | 0 | 0.2 | 0.4 | 0.6 |
|---|---|---|---|---|---|---|---|
| 300 | 12 | 13.1 | 14.4 | 14.6 | 15 | 16.1 | 18 |
| 400 | 12 | 13.1 | 14.3 | 14.5 | 15 | 16.1 | 18 |
| 500 | 12 | 13.1 | 14.2 | 14.4 | 14.9 | 16.1 | 18 |
| 600 | 12 | 13.1 | 14.1 | 14.3 | 14.8 | 16.1 | 18 |
| 700 | 12 | 13 | 14 | 14.2 | 14.6 | 16 | 18 |

AIR-FUEL RATIO DETECTION DEVICE AND AIR-FUEL RATIO DETECTION METHOD

CROSS-REFERENCE TO RELATED APPLICATIONS

This is a national phase application based on the PCT International Patent Application No. PCT/JP2011/077054 filed on Nov. 24, 2011, the entire contents of which are incorporated herein by reference.

TECHNICAL FIELD

This invention relates to an air-fuel ratio detection device and an air-fuel ratio detection method. More specifically, this invention relates to an air-fuel ratio detection device and an air-fuel ratio detection method that detect an air-fuel ratio based on the output of an air-fuel ratio sensor that is installed downstream of a catalyst in an exhaust passage of an internal combustion engine.

BACKGROUND ART

In Patent Literature 1, a system is disclosed in which air-fuel ratio sensors are installed on an upstream side and a downstream side, respectively, of a catalyst in an exhaust passage of an internal combustion engine. According to this system, a feedback correction coefficient is calculated based on the output of the respective air-fuel ratio sensors that are located upstream and downstream of the catalyst, and air-fuel ratio feedback control is executed using the feedback correction coefficient.

CITATION LIST

Patent Literature

Patent Literature 1: Japanese Patent Laid-Open No. 2005-248914
Patent Literature 2: Japanese Patent Laid-Open No. 2006-291893
Patent Literature 3: Japanese Patent Laid-Open No. 2006-002579
Patent Literature 4: Japanese Patent Laid-Open No. 2003-097334
Patent Literature 5: Japanese Patent Laid-Open No. 11-093744
Patent Literature 6: Japanese Patent Laid-Open No. 2006-010583

SUMMARY OF INVENTION

Technical Problem

Due to the establishment of exhaust gas regulations and the like in recent years, conventional catalysts have a high level of purification performance. As a result, the concentration of components that an air-fuel ratio sensor detects in exhaust gas that flows out to a downstream side of a catalyst is extremely low. That is, the detection object of an air-fuel ratio sensor that is arranged on a downstream side of a catalyst is an air-fuel ratio of exhaust gas containing an extremely low concentration of components. Accordingly, it can be considered that, at the air-fuel ratio sensor on the downstream side, for example, even when an oxygen leak of a minute amount is occurring, the leak significantly affects the output of the air-fuel ratio sensor and consequently the output deviates from the true value.

When calculating a feedback correction coefficient based on the output of air-fuel ratio sensors that are arranged at positions before and after the catalyst as in the aforementioned conventional technology, if an output error occurs at the air-fuel ratio sensor on the downstream side, the correction coefficient will not be correctly calculated and the accuracy of the air-fuel ratio feedback control will decrease. From this respect, a system is desirable by which an air-fuel ratio can be detected with greater accuracy on the basis of the output of the air-fuel ratio sensor on the downstream side which takes extremely low concentration gas as a detection object.

An object of the present invention is to solve the above described problem, and the present invention provides an air-fuel ratio detection device and an air-fuel ratio detection method that have been improved so that an air-fuel ratio can be detected with greater accuracy based on the output of an air-fuel ratio sensor that is arranged downstream of a catalyst.

Solution to Problem

To achieve the above described object, the present invention provides an air-fuel ratio detection device including: means for detecting an output of a downstream sensor that is a limiting-current type air-fuel ratio sensor that is arranged at a downstream side of a catalyst in an exhaust passage of an internal combustion engine; and calculation means for calculating an air-fuel ratio of exhaust gas at the downstream of the catalyst in accordance with an output of the downstream sensor. In the air-fuel ratio detection device, when the output of the downstream sensor is within a predetermined range that includes an output in accordance with a theoretical air-fuel ratio, a relationship between the output of the downstream sensor and the air-fuel ratio that is calculated by the calculation means is a relationship that is shifted more to a rich side relative to a correspondence relationship between an output of an upstream sensor which is a similar sensor to the downstream sensor and which is arranged at an upstream side of a catalyst in an exhaust passage of an internal combustion engine and an air-fuel ratio.

Alternatively, to achieve the above described object, the present invention provides an air-fuel ratio detection method that detects an output of a downstream sensor that is a limiting-current type air-fuel ratio sensor that is arranged at a downstream side of a catalyst in an exhaust passage of an internal combustion engine, and calculates an air-fuel ratio of exhaust gas at the downstream of the catalyst based on an output of the downstream sensor, wherein in a case where the output of the downstream sensor is within a predetermined range that includes an output corresponding to a theoretical air-fuel ratio, a relationship between the output of the downstream sensor and an air-fuel ratio that is calculated in accordance with the output is a relationship that is shifted more to a rich side relative to a correspondence relationship between an output of an upstream sensor which is a similar sensor to the downstream sensor and which is arranged at an upstream side of a catalyst in an exhaust passage of an internal combustion engine and an air-fuel ratio.

Note that the term "upstream sensor" does not necessarily refer to an air-fuel ratio sensor on an upstream side of a catalyst that is arranged in an exhaust passage of the same internal combustion engine. That is, a "correspondence relationship between an output of an upstream sensor and an air-fuel ratio" may be, for example, a correspondence relationship between the output and the air-fuel ratio in a case where it is supposed that the downstream sensor is used upstream of a catalyst. The "correspondence relationship between an output of an upstream sensor and an air-fuel ratio" may be, for example, a correspondence relationship between the output and the air-fuel ratio that, in a case where an upstream sensor that is actually being used in the same or a different internal combustion engine is a similar sensor to the downstream side sensor, is used when calculating the air-fuel ratio based the output of the upstream sensor.

Further, in the present invention, "a relationship between the output of the downstream sensor and an air-fuel ratio that is calculated is shifted more to a rich side relative to a correspondence relationship between an output of an upstream sensor and an air-fuel ratio" may refer to a relationship in which an air-fuel ratio that is calculated in accordance with the output of a downstream sensor was shifted so as to be a value that is more on a rich side relative to an air-fuel ratio that corresponds to an output of the same value as the aforementioned output in the correspondence relationship of the upstream sensor.

Alternatively, in the present invention, a "relationship between the output of the downstream sensor and an air-fuel ratio that is calculated is shifted more to a rich side relative to a correspondence relationship between an output of an upstream sensor and an air-fuel ratio" may refer to a relationship in which, when an air-fuel ratio that is calculated according to the output of the downstream sensor and an air-fuel ratio that is calculated according to an output of an upstream sensor based on a correspondence relationship of the upstream sensor are identical, a value of the output of the downstream sensor shifted so as to become a value that is more on a lean side relative to a value of the output of the upstream sensor.

In addition, the air-fuel ratio detection device of the present invention may further include means for detecting or estimating a temperature of an element portion of the downstream sensor. In this case, when the output of the downstream sensor is within the predetermined range, a relationship between the output of the downstream sensor and an air-fuel ratio that is calculated based on the output may be a relationship that, when the temperature of the element portion is high, is shifted more to a rich side than when the temperature of the element portion is low. Note that in this case the relationship between the output of the downstream sensor and the air-fuel ratio that is calculated may be a relationship that is gradually shifted so as to become a value on the rich side as the temperature of the element portion rises. Alternatively, a plurality of temperature regions may be set with respect to the temperature of the element portion, and the relationship between the output of the downstream sensor and the air-fuel ratio that is calculated may be a stepwise relationship such as a relationship that, in a case where the temperature of the element portion is in a certain temperature region, shifts to the rich side more than in a case where the temperature of the element portion is in a lower temperature region than the certain temperature region.

Furthermore, the air-fuel ratio detection device of the present invention may further include means for detecting or estimating an exhaust gas flow rate that is discharged into the exhaust passage of the internal combustion engine. In this case, when the output of the downstream sensor is within the predetermined range, a relationship between the output of the downstream sensor and an air-fuel ratio that is calculated based on the output may be a relationship that, when the exhaust gas flow rate is small, is shifted more to the rich side than when the exhaust gas flow rate is large. Note that in this case the relationship between the output of the downstream sensor and the air-fuel ratio that is calculated may be a relationship that is gradually shifted to the rich side as the exhaust gas flow rate decreases. Alternatively, a plurality of regions may be set with respect to the exhaust gas flow rate, and the relationship between the output of the downstream sensor and the air-fuel ratio that is calculated may be a stepwise relationship such as a relationship that, in a case where the exhaust gas flow rate is in a certain region, shifts to the rich side more than in the case of a region in which the exhaust gas flow rate is less than in the certain region.

In addition, the air-fuel ratio detection device of the present invention may further include means for detecting or estimating a temperature of exhaust gas that is discharged into the exhaust passage of the internal combustion engine. In this case, when the output of the downstream sensor is within the predetermined range, a relationship between the output of the downstream sensor and an air-fuel ratio that is calculated based on the output may be a relationship that, when the exhaust gas temperature is high, is shifted more to the rich side than when the exhaust gas temperature is low. Note that in this case the relationship between the output of the downstream sensor and the air-fuel ratio that is calculated may be a relationship that is gradually shifted to the rich side as the exhaust gas temperature increases. Alternatively, a plurality of regions may be set with respect to the exhaust gas temperature, and the relationship between the output of the downstream sensor and the air-fuel ratio that is calculated may be a stepwise relationship such as a relationship that, in a case where the exhaust gas temperature is in a certain temperature region, shifts to the rich side more than in the case of a temperature region in which the exhaust gas temperature is lower than in the certain temperature region.

Further, in the present invention, in a relationship with respect to the temperature of the element portion of the downstream sensor, the exhaust gas flow rate, or the exhaust gas temperature, the term that the relationship between the output and the air-fuel ratio "shifts to the rich side" may refer to, as described above, a relationship such that an air-fuel ratio that is calculated according to the output of the downstream sensor by the calculation means shifted so as to become a value that is more on the rich side relative to an air-fuel ratio corresponding to an output of the same value as the aforementioned output in a correspondence relationship of the upstream sensor, or may be a relationship such that, when an air-fuel ratio that is calculated according to the output of the downstream sensor by the calculation means and an air-fuel ratio that is calculated according to an output of an upstream sensor based on a correspondence relationship of the upstream sensor are identical, a value of the output of the downstream sensor is shifted so as to become a value that is more on a lean side relative to a value of the output of the upstream sensor.

In the present invention, the calculation means may include first means for calculating an air-fuel ratio according to an output of the downstream sensor based on a similar relationship to the correspondence relationship of the upstream sensor, and second means for, when the output of the downstream sensor is within the predetermined range, correcting the calculated air-fuel ratio so that the calculated air-fuel ratio becomes an air-fuel ratio on the rich side.

In a case where the calculation means includes the second means that is means for correcting in this manner, the air-fuel ratio detection device may further include means for detecting or estimating a temperature of an element portion of the downstream sensor, and in a case where the temperature of the element portion is high, the second means may correct the air-fuel ratio more to the rich side than in a case where the temperature of the element portion is low. In this case, the amount of a correction to the rich side by the second means may be an amount that gradually increases as the temperature of the element portion rises, and a plurality of temperature regions may be set with respect to the temperature of the element portion, and the correction amount may change in a stepwise manner with respect to each temperature region.

Further, in a case where the calculation means includes the second means that is means for correcting, the air-fuel ratio detection device may further include means for detecting or estimating an exhaust gas flow rate that is discharged from the internal combustion engine, and in a case where the exhaust gas flow rate is small, the second means may correct the air-fuel ratio more to the rich side than in a case where the exhaust gas flow rate is large. In this case, the amount of a correction to the rich side by the second means may be an amount that gradually increases as the exhaust gas flow rate decreases, and a plurality of temperature regions may be set with respect to the exhaust gas flow rate, and the correction amount may change in a stepwise manner with respect to each temperature region.

In addition, in a case where the calculation means includes the second means that is means for correcting, the air-fuel ratio detection device may further include means for detecting or estimating a temperature of exhaust gas that is discharged from the internal combustion engine, and in a case where the exhaust gas temperature is high, the second means may correct the air-fuel ratio more to the rich side than in a case where the exhaust gas temperature is low. In this case, the amount of a correction to the rich side by the second means may be an amount that gradually increases as the exhaust gas temperature rises, and a plurality of temperature regions may be set with respect to the exhaust gas temperature, and the correction amount may change in a stepwise manner with respect to each temperature region.

In the present invention, the calculation means may also include third means for correcting the output of the downstream sensor to a value on the rich side when the output is within the predetermined range, and fourth means for calculating an air-fuel ratio based on a similar relationship to the correspondence relationship of the upstream sensor according to the corrected output.

In a case where the calculation means includes the third means that is correction means, the air-fuel ratio detection device may further include means for detecting or estimating a temperature of an element portion of the downstream sensor, and in a case where the temperature of the element portion is high, the third means may correct the output more to the rich side than in a case where the temperature of the element portion is low. In this case, the amount of a correction to the rich side by the third means may be an amount that gradually increases as the temperature of the element portion rises, and a plurality of temperature regions may be set with respect to the temperature of the element portion, and the correction amount may change in a stepwise manner with respect to each temperature region.

Further, in a case where the calculation means includes the third means that is correction means, the air-fuel ratio detection device may further include means for detecting or estimating an exhaust gas flow rate that is discharged from the internal combustion engine, and in a case where the exhaust gas flow rate is small, the third means may correct the output more to the rich side than in a case where the exhaust gas flow rate is large. In this case, the amount of a correction to the rich side by the third means may be an amount that gradually increases as the exhaust gas flow rate decreases, and a plurality of temperature regions may be set with respect to the exhaust gas flow rate, and the correction amount may change in a stepwise manner with respect to each temperature region.

In addition, in a case where the calculation means includes the third means that is correction means, the air-fuel ratio detection device may further include means for detecting or estimating a temperature of exhaust gas that is discharged from the internal combustion engine, and in a case where the exhaust gas temperature is high, the third means may correct the output more to the rich side than in a case where the exhaust gas temperature is low. In this case, the amount of a correction to the rich side by the third means may be an amount that gradually increases as the exhaust gas temperature rises, and a plurality of temperature regions may be set with respect to the exhaust gas temperature, and the correction amount may change in a stepwise manner with respect to each temperature region.

Alternatively, in the air-fuel ratio detection method of the present invention, first, an air-fuel ratio may be calculated according to the output of the downstream sensor based on a similar relationship to the correspondence relationship of the upstream sensor, and if the output of the downstream sensor is within the predetermined range, the calculated air-fuel ratio may be corrected to the rich side.

Alternatively, in the air-fuel ratio detection method of the present invention, first, if the output of the downstream sensor is within the predetermined range, the output may be corrected to a value on the rich side, and an air-fuel ratio may be calculated based on a similar relationship to the correspondence relationship between the output of the upstream sensor and the air-fuel ratio in accordance with the corrected output.

The air-fuel ratio detection method of the present invention may be a method that detects or estimates a temperature of an element portion of the downstream sensor, and when the output of the downstream sensor is within the predetermined range, makes an air-fuel ratio that is calculated according to the output of the downstream sensor in a case where the temperature of the element portion is high a value that is more on the rich side than an air-fuel ratio that is calculated according to an output of a same value as the output in a case where the temperature of the element portion is low. Note that similarly to the case of the air-fuel ratio detection device, an air-fuel ratio that is calculated according to the same output may be gradually shifted so as to become a value on the rich side as the temperature of the element portion rises, and a plurality of temperature regions may be set with respect to the temperature of the element portion, and the air-fuel ratio may be set so as to become a value on the rich side in a stepwise manner with respect to each temperature region.

The air-fuel ratio detection method of the present invention may be a method that detects or estimates an exhaust gas flow rate that is discharged into the exhaust passage of the internal combustion engine, and when the output of the downstream sensor is within the predetermined range, makes an air-fuel ratio according to the output of the downstream sensor in a case where the exhaust gas flow rate is small a value that is more on the rich side than an air-fuel ratio that is calculated according to an output of a same value as the output in a case where the exhaust gas flow rate is large. Note that similarly to the case of the air-fuel ratio detection device, an air-fuel ratio that is calculated according to the same output may be gradually shifted to a value on the rich side as the exhaust gas flow rate decreases, and a plurality of regions may be set with respect to the exhaust gas flow rate, and the air-fuel ratio may be set so as to become a value on the rich side in a stepwise manner with respect to each of the regions.

The air-fuel ratio detection method of the present invention may be a method that detects or estimates a temperature of exhaust gas that is discharged into the exhaust passage of the internal combustion engine, and when the output of the downstream sensor is within the predetermined range, makes an air-fuel ratio according to the output of the downstream sensor in a case where the exhaust gas temperature is high a value that is more on the rich side than an air-fuel ratio that is calculated according to an output of a same value as the output in a case where the exhaust gas temperature is low. Note that similarly to the case of the air-fuel ratio detection device, an air-fuel ratio that is calculated according to the same output may be gradually shifted to a value on the rich side as the exhaust gas temperature rises, and a plurality of regions may be set with respect to the exhaust gas temperature, and the air-fuel ratio may be set so as to become a value on the rich side in a stepwise manner with respect to each of the regions.

Advantageous Effects of Invention

In a case where an air-fuel ratio sensor is arranged on a downstream side of a catalyst, a concentration of the exhaust gas that the air-fuel ratio sensor detects is especially weak in the vicinity of the theoretical air-fuel ratio. Consequently, in the vicinity of the theoretical air-fuel ratio, an air-fuel ratio that is determined based on the output of a conventional air-fuel ratio sensor that is affected by a minute change in the oxygen concentration caused by an oxygen leak is liable to deviate to the lean side. In this respect, according to the air-fuel ratio detection device and the air-fuel ratio detection method of the present invention, in a case where the air-fuel ratio is the theoretical air-fuel ratio or is in the vicinity thereof, the relationship between the output of the air-fuel ratio sensor on the downstream side of the catalyst and the air-fuel ratio is shifted more to the rich side relative to a usual time. It is thereby possible to counteract the effect of the oxygen leak to obtain a more accurate air-fuel ratio.

In addition, for example, it is considered that the amount of an oxygen leak increases when the temperature of the element portion or the exhaust gas temperature rises. Consequently, the effect of a change in the oxygen concentration in the vicinity of the theoretical air-fuel ratio increases as the temperature of the element portion or the exhaust gas temperature rises. In this respect, if the relationship between the output and the air-fuel ratio is one that is shifted to the rich side in a case where the temperature of the element portion or the exhaust gas temperature of the present invention is high, it is possible to correspond to different leak amounts that are caused by differences in temperature, and counteract the effect of the leak and obtain the air-fuel ratio in a more accurate manner.

Further, for example, as the exhaust gas flow rate increases, an exhaust gas flow rate in the vicinity of the air-fuel ratio sensor on the downstream side increases while the influence of leaked oxygen decreases. In this respect, when the exhaust gas flow rate of the present invention is small, if a calculated air-fuel ratio is one that is shifted to the rich side, differences in the magnitude of the influence of leaked oxygen that are due to differences in the exhaust gas flow rate can be taken into account and thus the air-fuel ratio can be obtained in a more accurate manner.

BRIEF DESCRIPTION OF DRAWINGS

FIG. 7 is a table for describing a map that defines relationships between intake air amounts, sensor outputs, and air-fuel ratios according to Embodiment 3.

FIG. 8 is a flowchart for describing a routine of control that the control apparatus executes in Embodiment 3 of the present invention.

FIG. 9 is a view for describing a relationship between the sensor output and air-fuel ratio according to Embodiment 4 of the present invention.

DESCRIPTION OF EMBODIMENTS

Figure 1:
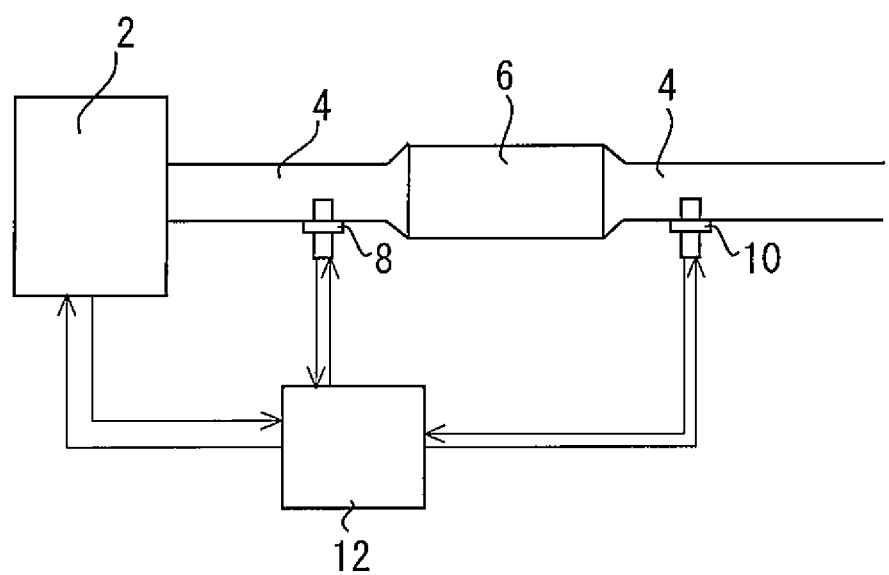
FIG. 1 is a schematic diagram for describing the overall configuration of a system according to an embodiment of the present invention.

Embodiments of the present invention are described hereunder with reference to the drawings. For each of the drawings, the same or corresponding portions are denoted by the same reference numerals, and a description of such portions is simplified or omitted.

Embodiment 1

[Overall Configuration of System of Present Embodiment]

FIG. 1 is a schematic diagram for describing the overall configuration of a system according to an embodiment of the present invention. The system shown in FIG. 1 is mounted and used in a vehicle or the like. In FIG. 1, a three-way catalyst 6 is arranged in an exhaust passage 4 of an internal combustion engine 2. The three-way catalyst 6 is a catalyst that oxidizes carbon monoxide (CO) and hydrocarbon (HC) discharged from the internal combustion engine 2, and also reduces nitrogen oxides (NOx) to thereby purify the exhaust gas.

An air-fuel ratio sensor 8 is arranged on an upstream side of the three-way catalyst 6 in the exhaust passage 4, and an air-fuel ratio sensor 10 is arranged on a downstream side of the three-way catalyst 6 in the exhaust passage 4. The air-fuel ratio sensors 8 and 10 are each a limiting-current type single-cell air-fuel ratio sensor, and emit an output in accordance with a component concentration of lean components (NOx, $O_2$ or the like) and rich components (CO, HC or the like) contained in the exhaust gas. Note that, to simplify the description, the air-fuel ratio sensor 8 on the upstream side of the three-way catalyst 6 and the air-fuel ratio sensor 10 on the downstream side thereof in Embodiment 1 may also be referred to as "upstream sensor" and "downstream sensor", respectively, in the following embodiments.

The system shown in FIG. 1 includes a control apparatus 12. The control apparatus 12 performs overall control of the entire system of the internal combustion engine 2. Various actuators are connected to an output side of the control apparatus 12, and various sensors such as the air-fuel ratio sensors 8 and 10 are connected to an input side thereof. The control apparatus 12 receives signals from the sensors to thereby detect the air-fuel ratio of exhaust gas, the number of engine revolutions, and various other kinds of information required for operation of the internal combustion engine 2, and operates the respective actuators in accordance with a predetermined control program. Note that a large number of actuators and sensors are connected to the control apparatus 12, however, a description of such actuators and sensors is omitted in the present specification.

[Configuration of Air-Fuel Ratio Sensors of Present Embodiment]

Figure 2:
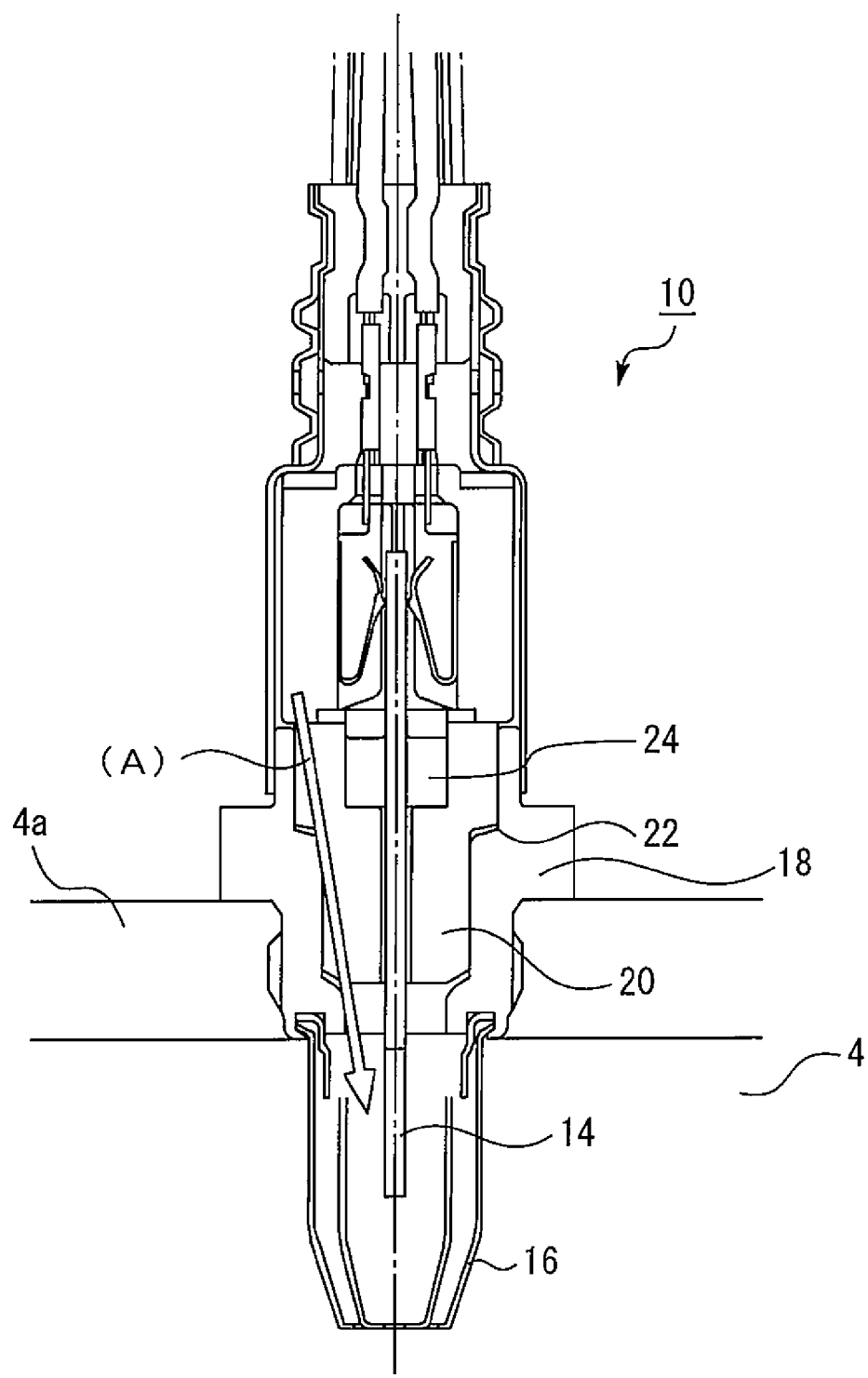
FIG. 2 is a schematic diagram for describing the configuration of the air-fuel ratio sensor of Embodiment 1 of the present invention.

FIG. 2 is a schematic diagram for describing the configuration of the air-fuel ratio sensors 8 and 10 of Embodiment 1 of the present invention. In FIG. 2, the downstream sensor 10 is described as an example. However, the upstream sensor 8 and the downstream sensor 10 have the same configuration in Embodiment 1.

As shown in FIG. 2, the downstream sensor 10 includes an element portion 14. The element portion 14 has a tubular structure in which one end is closed. An atmosphere-side electrode (not illustrated in the drawings) is formed on the inner surface of the element portion 14 that is formed in a tubular shape. The configuration is such that external air flows into the inside of the tubular portion, and as a result the atmosphere-side electrode contacts the external air. On the other hand, an exhaust-side electrode (not illustrated in the drawings) is formed on the outer surface of the tubular portion.

The element portion 14 is arranged in the exhaust passage 4 in a state in which the element portion 14 is covered with a cover 16. A plurality of vent holes (not illustrated in the drawings) are provided in the cover 16 for introducing exhaust gas to the inside thereof. The exhaust-side electrode of the element portion 14 is exposed to the exhaust gas that flows into the inner side of the cover 16 from the vent holes.

The cover 16 is fixed to a wall face 4a of the exhaust passage 4 by a housing 18. More specifically, the housing 18 engages with the cover 16 at a portion that is attachable to the exhaust passage 4, and fixes and holds the downstream sensor 10 on the exhaust passage wall face 4a in a state in which an upper edge portion of the cover 16 is caulked.

The inside of the housing 18 is sealed by various members so that air does not leak inside the cover 16, and the element portion 14 is supported therein. More specifically, for example, a ceramic 20 is fitted into the housing 18, and the element portion 14 is held therein. A talc material 22 is embedded in a gap between the ceramic 20 and the housing 18. Further, glass 24 or the like is disposed on an upper portion of the ceramic 20. The atmosphere-side electrode (inside surface of the tubular portion) side of the downstream-side sensor 10 and the exhaust-side electrode side are shielded from each other, and thus leakage of gas between the atmosphere side and the exhaust gas side is prevented.

The upstream sensor 8 and the downstream sensor 10 are arranged inside the exhaust passage 4, and are exposed to high-temperature exhaust gas at a time of use. Consequently, even when the configuration is one in which the atmosphere side and the exhaust gas side are isolated from each other, in practice, as shown by an arrow (A) in FIG. 2, a minute amount of air passes through the ceramic and talc material and the like that form the above described seal structure and leaks into the exhaust gas inside the cover 16.

[Output of Upstream Sensor 8 and Air-Fuel Ratio of Embodiment 1]

Control that the control apparatus 12 executes in the system of Embodiment 1 includes detection of an air-fuel ratio based on the respective outputs of the upstream sensor 8 and the downstream sensor 10, and various kinds of control that use the air-fuel ratio. A predetermined voltage is applied to each of the upstream sensor 8 and the downstream sensor 10 when detecting an air-fuel ratio. The upstream sensor 8 and the downstream sensor 10 each emit an output that is a current value in accordance with a concentration of rich components and lean components (hereunder, also referred to as "component concentration") that influence the output of the air-fuel ratio sensors, that are contained in the exhaust gas. The current value and the air-fuel ratio theoretically have a correlation with each other, based on which and the sensor output, the air-fuel ratio can be determined.

Figure 3:
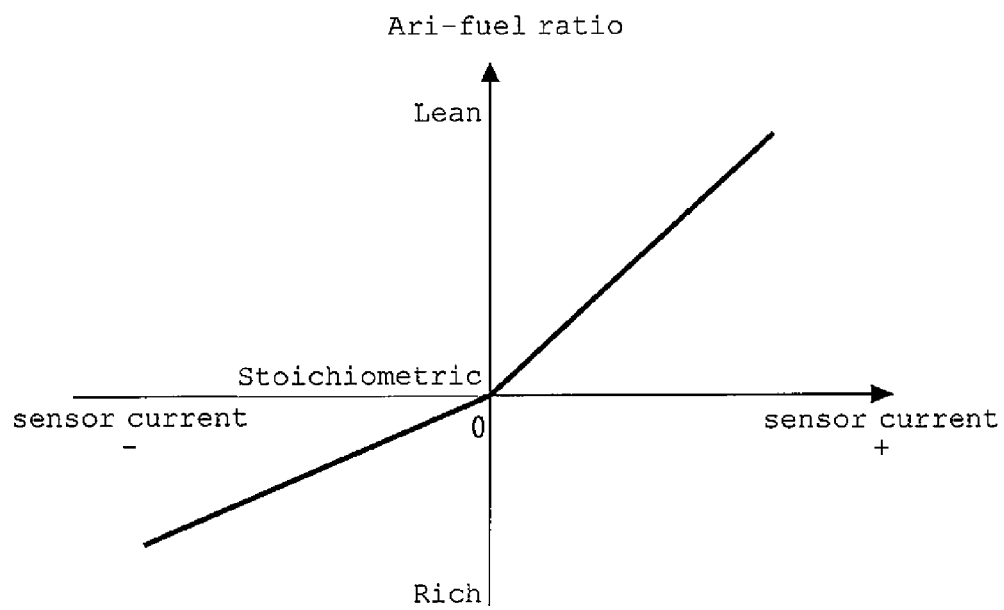
FIG. 3 is a diagram for describing a correspondence relationship between the sensor output of the upstream sensor and the air-fuel ratio according to Embodiment 1 of the present invention.

FIG. 3 is a diagram for describing a correspondence relationship between the sensor output of the upstream sensor 8 and the air-fuel ratio according to Embodiment 1 of the present invention. In FIG. 3, the horizontal axis represents the sensor output and the vertical axis represents the air-fuel ratio. The relationship between the sensor output of the upstream sensor 8 and the air-fuel ratio is similar to that of a conventional limiting-current type sensor, and is a theoretically determined relationship. In the upstream sensor 8, a zero output point is taken as a stoichiometric (theoretical air-fuel ratio) point, and as the output becomes less than zero, the air-fuel ratio that corresponds thereto decreases to show an air-fuel ratio that is more on the rich side. In contrast, as the output becomes greater than zero, the air-fuel ratio that corresponds thereto increases to show an air-fuel ratio that is more on the lean side. Although the slope of the line in FIG. 3 differs in a manner that takes the zero point as a boundary because of the characteristics of the air-fuel ratio sensor, the sensor output and the air-fuel ratio exhibit a substantially proportional relationship.

The upstream sensor 8 takes exhaust gas that was discharged from the internal combustion engine 2 and that has not yet passed through the three-way catalyst 6 as a detection object. Accordingly, a component concentration of the exhaust gas is high. Under this environment, even if an oxygen leak occurs to some extent as described above, the leak has almost no influence on the sensor output, and the leak of oxygen can be ignored. Accordingly, with respect to the upstream sensor 8, the relationship between the output and the air fuel ratio that is shown in the theoretical relationship in FIG. 3 is stored as a function or a map in the control apparatus 12. At a time of actual use, an air fuel ratio in accordance with the output of the upstream sensor 8 is detected based on the aforementioned function or map or the like.

[Output of Downstream Sensor 10 and Air-Fuel Ratio of Embodiment 1]

Figure 4:
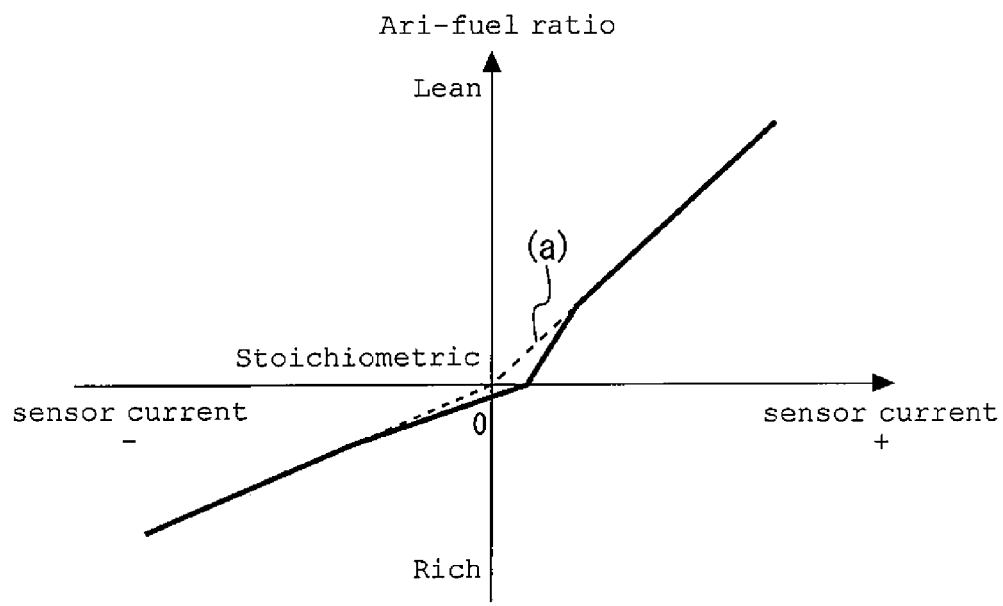
FIG. 4 is a diagram for describing a relationship between the sensor output of the downstream sensor and the air-fuel ratio according to Embodiment 1 of the present invention.

FIG. 4 is a diagram for describing a relationship between the sensor output of the downstream sensor 10 and the air-fuel ratio according to Embodiment 1 of the present invention. In FIG. 4, the horizontal axis represents the sensor output and the vertical axis represents the air-fuel ratio.

The downstream sensor 10 is arranged further downstream than the three-way catalyst 6, and takes exhaust gas that was purified by the three-way catalyst 6 as a detection object. In particular, when the air fuel ratio is controlled to a ratio in the vicinity of stoichiometry, the purification rate of the three-way catalyst 6 is high. Accordingly, the amount of each component contained in the exhaust gas is extremely small on the downstream side of the three-way catalyst 6, and the component concentration is extremely weak. Therefore, in the vicinity of stoichiometry, a minute amount of leaking oxygen affects the sensor output. As a result, the output of the downstream sensor 10 in the vicinity of stoichiometry is an output that deviates more to the lean side that an output that corresponds to the air fuel ratio of the actual exhaust gas.

Accordingly, in order to correct the aforementioned output deviation to the lean side caused by the oxygen leak, in Embodiment 1 the relationship between the output and the air fuel ratio is set so that an air fuel ratio with respect to the output of the downstream sensor 10 is shifted to the rich side in comparison to the case of the upstream sensor 8 (see broken line (a) in FIG. 4). That is, in a predetermined range including the zero point as shown in FIG. 4, the relationship between the output and the air fuel ratio is set by shifting to the rich side.

The above described relationship between the output of the downstream sensor 10 and the air fuel ratio is determined by an experiment or the like. More specifically, for example, assuming the situation on the downstream of the three-way catalyst 6, an evaluation gas of an extremely low concentration obtained by completely combusting a gas composed of 100% $N_2$ or a rich gas and a lean gas at an equivalence ratio or the like is supplied as an evaluation gas to the air-fuel ratio sensor, and the sensor output is detected, and similarly, based on this gas, in a predetermined range as shown in FIG. 4, the air-fuel ratio concentration is changed consecutively to the rich side or lean side, and outputs with respect thereto are detected. The relationship between the output in the predetermined range of the downstream sensor 10 and the air-fuel ratio is determined based on the relationship between the aforementioned output and the air-fuel ratio. The thus-determined relationship is stored in advance in the control apparatus 12.

In the actual control the output of the upstream sensor 8 and the output of the downstream sensor 10 are respectively detected, and air-fuel ratios in accordance with the respective outputs are calculated based on the relationships between the respective outputs and air-fuel ratios that were stored in correspondence with the upstream sensor 8 and the downstream sensor 10 (see FIG. 3 and FIG. 4).

As described above, the relation between the output of the downstream sensor 10 and the air-fuel ratio in Embodiment 1 is a relation in which the influence of a leak in the vicinity of stoichiometry is taken into consideration. Accordingly, even in the vicinity of stoichiometry, the air-fuel ratio can be detected more accurately according to the output of the downstream sensor 10. Therefore, the precision of, for example, air-fuel ratio feedback control or control to determine catalyst deterioration or the like that is executed based on the output of both the upstream sensor 8 and the downstream sensor 10 can be improved.

According to Embodiment 1 a case has been described in which a relationship between an output and an air-fuel ratio is set in accordance with the downstream sensor 10. The relationship between the output and the air-fuel ratio is a relationship such that, relative to a correspondence relationship between the output of the upstream sensor 8 and the air-fuel ratio, a relationship between the same output and an air-fuel ratio in the vicinity of stoichiometry is shifted to the rich side. Further, according to Embodiment 1, with respect to the downstream sensor 10 also, an air-fuel ratio can be directly determined based on a previously set relationship in accordance with a detected output.

However, the present invention is not limited thereto and, for example, a configuration may be adopted that performs a correction of a direction in which an air-fuel ratio in the vicinity of stoichiometry is caused to shift to the rich side with respect to the output of the downstream sensor 10 or the air-fuel ratio. More specifically, for example, first, an air-fuel ratio is calculated with respect to the upstream sensor 8 and the downstream sensor 10 based on the same relation, that is, based on a relationship between the output of the upstream sensor 8 and the air-fuel ratio. Thereafter, the air-fuel ratio on the downstream side can be determined by correcting the calculated air-fuel ratio by means of a correction amount that is set according to the output of the downstream sensor 10 in the vicinity of stoichiometry.

Alternatively, for example, first, the output of the downstream sensor 10 is corrected so as to become an output that is more on the rich side relative to the detected output. Thereafter, the air-fuel ratio on the downstream side can be determined by calculating an air-fuel ratio based on the relation between the same output and air-fuel ratio as the upstream sensor 8 in accordance with the corrected output. These methods of calculating an air-fuel ratio based on an output may also be similarly applied with respect to the embodiments described hereunder.

In addition, according to Embodiment 1 a case has been described in which only the three-way catalyst 6 is shown in the exhaust passage 4, and the air-fuel ratio sensors 8 and 10 are arranged upstream and downstream thereof, respectively. However, the present invention is not limited to such a configuration. For example, the present invention can also be applied to a configuration in which a tandem catalyst having two catalysts that are arranged in series and integrally is arranged in the exhaust passage 4. In this case, from the viewpoint of improving the precision of air-fuel ratio feedback control, it is preferable to arrange the upstream sensor 8 upstream of the tandem catalyst and to arrange the downstream sensor 10 between the two catalysts in the tandem catalyst. However, the arrangement positions of the air-fuel ratio sensors 8 and 10 are not necessarily limited thereto. The foregoing similarly applies with respect to the embodiments described hereunder.

Furthermore, according to Embodiment 1 a case has been described in which the upstream sensor 8 and the downstream sensor 10 are limiting-current type sensors that have the same configuration. However, in the present invention, with respect to the sensor that is arranged on the upstream side of the catalyst 6, another sensor that can detect an air-fuel ratio may also be used. The foregoing similarly applies with respect to the embodiments described hereunder.

Embodiment 2

The system and the air-fuel ratio sensors 8 and 10 of Embodiment 2 have similar configurations to the configurations illustrated in FIG. 1 and FIG. 2. The system of Embodiment 2 is the same as the system in Embodiment 1 except that the relation between the output and the air-fuel ratio in the vicinity of stoichiometry of the downstream sensor 10 is changed according to the temperature of the element portion 14.

Figure 5:
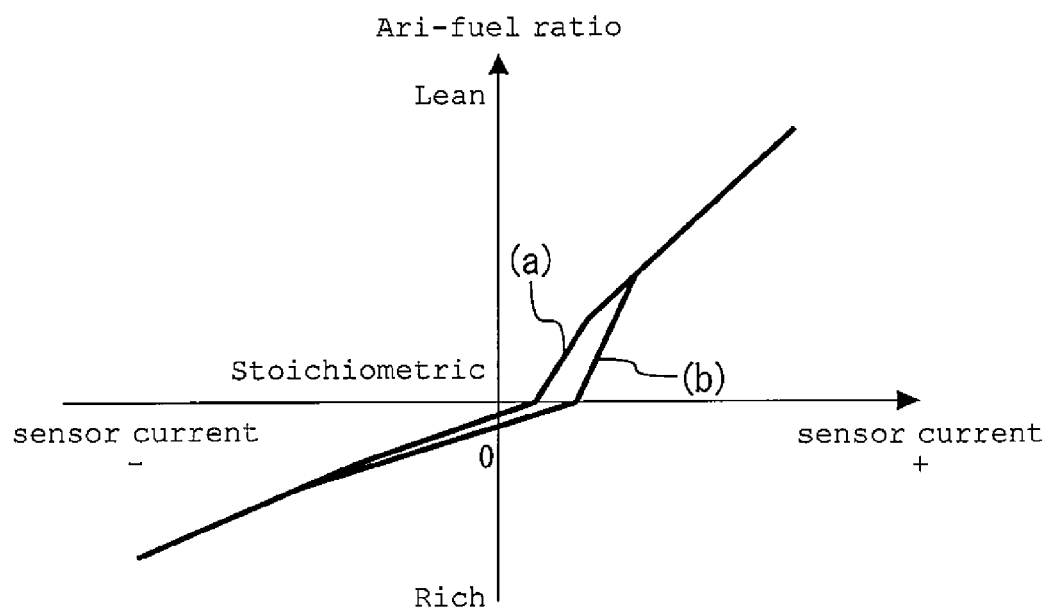
FIG. 5 is a view for describing the relationship between the output of the downstream sensor and the air-fuel ratio according to Embodiment 2 of the present invention.

FIG. 5 is a view for describing the relationship between the output of the downstream sensor 10 and the air-fuel ratio according to Embodiment 2 of the present invention. In FIG. 5, the horizontal axis represents the sensor output, and the vertical axis represents the air-fuel ratio. Further, in FIG. 5, a solid line (a) represents a case in which the temperature of the element portion 14 is a normal control temperature of 750° C., and a solid line (b) represents a case in which the temperature of the element portion 14 is a high temperature of 850° C.

As described above, with respect to a leak of air to the exhaust side (inside of the case 16) of the element portion 14, one cause thereof is a deformation that is produced by various sealing members being exposed to a high temperature. That is, a leak amount of air increases as the temperature at which the air-fuel ratio sensors 8 and 10 are being used rises. Accordingly, in the vicinity of stoichiometry, the influence of leaked oxygen on the output of the downstream sensor 10 appears to a greater degree in the case of a high temperature.

In order to correspond to changes in the leak amount that depend on the temperature, in Embodiment 2 a shift amount to the rich side is changed according to the temperature of the element portion 14. More specifically, with respect to the temperature of the element portion 14, two temperature regions are set, namely, a temperature region that is centered on a normal control temperature, and a temperature region for a case of a high temperature that is higher than the aforementioned temperature region. In addition, a relationship between an output and an air-fuel ratio is defined for each temperature region. Note that in the defined relationships, a shift amount to the rich side in a case where the temperature of the element portion 14 is in a temperature region of a low temperature (see (a)) is set to a smaller amount than a shift amount in a case where the temperature of the element portion 14 is in a temperature region of a high temperature (see (b)). That is, a shift amount in the case of a high temperature is set so as to calculate an air-fuel ratio on a rich side with respect to the same output.

Specific shift amounts that are in accordance with such temperatures can be determined by performing experiments under various temperature environments in which, for each downstream sensor 10, a concentration of a supplied exhaust gas is varied and the resulting outputs are detected. Relationships determined in this manner are stored in the control apparatus 12 as relational expressions or maps or the like that define relationships between temperatures, outputs, and air-fuel ratios. In a case where the downstream sensor 10 is actually installed in the exhaust passage 4 of the internal combustion engine 2 and used for air-fuel ratio control or the like, the impedance of the element portion 14 is detected and the temperature of the element portion 14 is estimated based on the detected impedance. An air-fuel ratio is calculated according to the map stored in the control apparatus 12 in accordance with the estimated temperature and the value of the output of the downstream sensor 10.

As described above, according to Embodiment 2, a relationship between the output and air-fuel ratio of the downstream sensor 10 is defined in a manner that takes into consideration differences in leak amounts of oxygen that are due to temperature differences. Consequently, the influence of leaked oxygen on the output can be suppressed to a small amount, an air-fuel ratio can be ascertained with greater accuracy on the downstream side of the three-way catalyst, and various kinds of control can be executed with high precision.

Note that, in Embodiment 2 a case has been described in which temperature regions are set with respect to the temperature of the element portion, and relationships between the output and the air-fuel ratio are defined for each case. According to this example, when the temperature of the element portion 14 is in a temperature region of a high temperature, an air-fuel ratio is calculated that is on a rich side in comparison to a case where the temperature of the element portion 14 is in a temperature region of a low temperature. However, in the present invention, a method of setting an output and an air-fuel ratio with respect to the temperature of the element portion is not limited to a method in which two temperature regions are set in this manner. For example, temperature regions of three or more levels may be set, and relationships between the output and the air-fuel ratio may be set that are shifted in correspondence with the respective temperature regions so as to shift in a stepwise manner to the rich side.

In addition, relationships may be set so that the air-fuel ratio is gradually shifted to the rich side in a stepless manner as the temperature of the element portion 14 rises. More specifically, for example, coefficients may established so as to shift the fundamental relationship between the output and the air-fuel ratio of the downstream sensor 10 (see FIG. 4) in accordance with the temperature of the element portion 14, and an air-fuel ratio in accordance with the temperature may be calculated based on the coefficient corresponding to the temperature and the relationship between the output and the air-fuel ratio.

Further, for example, an air-fuel ratio may be calculated according to the same relationship between the output and the air-fuel ratio at the upstream sensor 8 and the downstream sensor 10, and the output of the downstream sensor 10 or the calculated air-fuel ratio may be further corrected in accordance with the temperature. In this case also, a leak amount can also be taken into account by correcting the output of the downstream sensor 10 or the air-fuel ratio in a stepwise or stepless manner in accordance with the temperature.

According to Embodiment 2, a case has been described in which the temperature of the element portion 14 is detected based on the impedance. However, the present invention is not limited thereto, and a configuration may be adopted that detects the temperature by other means. More specifically, for example, a configuration may be adopted in which a temperature sensor is directly embedded in the element portion 14, and the temperature is detected by the temperature sensor.

Embodiment 3

The system and the upstream sensor 8 and the downstream sensor 10 of Embodiment 3 have the same configurations as those described with respect to FIG. 1 and FIG. 2. The system of Embodiment 3 performs the same control as the system of Embodiment 1 except that the air-fuel ratio in the vicinity of stoichiometry is shifted according to the flow rate of exhaust gas.

Figure 6:
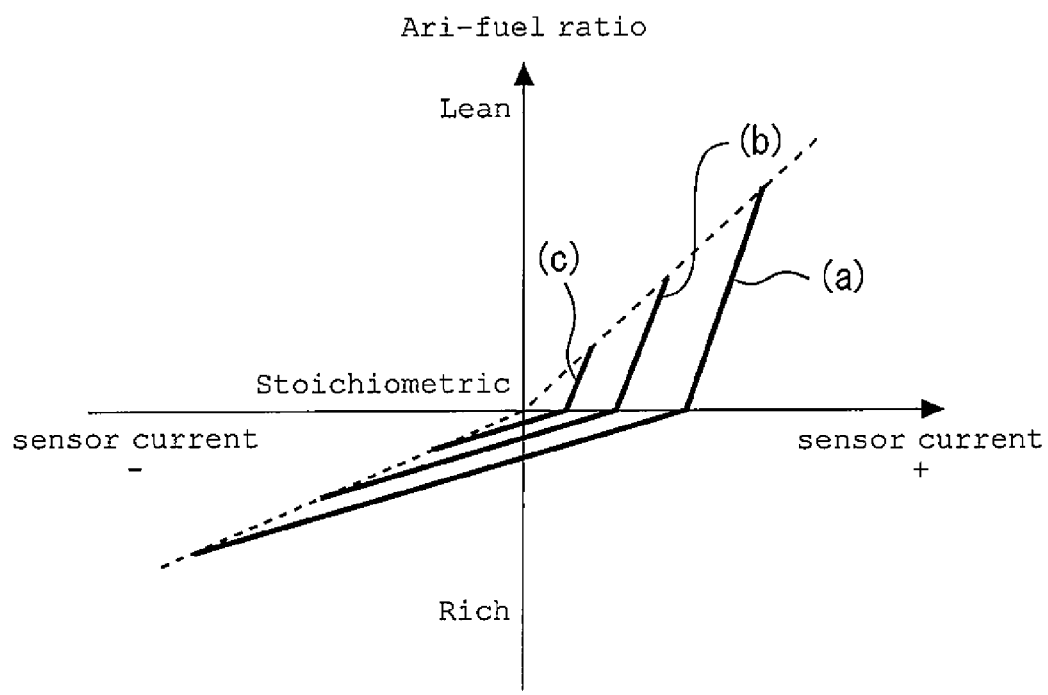
FIG. 6 is a view for describing the relationship between the output of the downstream sensor and the air-fuel ratio according to Embodiment 3 of the present invention.

FIG. 6 is a view for describing a relationship between the output and air-fuel ratio with respect to respective exhaust gas flow rates of the downstream sensor 10 according to Embodiment 3. In FIG. 6, the horizontal axis represents the output, and the vertical axis represents the air-fuel ratio. Further, FIG. 6 illustrates a relationship in a case where the exhaust gas flow rate increases as the relationship moves from a solid line (a) side to a solid line (c) side is shown.

As the amount of exhaust gas that is discharged from the internal combustion engine 2 increases, the exhaust gas flow rate around the downstream sensor 10 also increases, and the flow velocity thereof also quickens. Consequently, the influence that leaked oxygen has on the exhaust gas concentration decreases.

Accordingly, as shown by the solid line (c), as the exhaust gas flow rate increases, a shift amount to the rich side in a predetermined region in the vicinity of stoichiometry decreases. That is, when a certain output in the predetermined region is detected, although an air-fuel ratio that is determined on the basis thereof is an air-fuel ratio that is shifted more to the rich side relative to an air-fuel ratio corresponding to the same output of the upstream sensor 8, the shift amount is small in comparison to a case where the exhaust gas flow rate is small (solid lines (a) and (b)).

In contrast, when the exhaust gas flow rate is small, as shown by the solid line (a), a shift amount to the rich side increases in a predetermined region in the vicinity of stoichiometry. When an output that is within this region was outputted, an air-fuel ratio that is determined on the basis thereof is an air-fuel ratio that is shifted by a large amount to the rich side compared to when the exhaust gas flow rate is large (solid line (c)) or to an air-fuel ratio that corresponds to the same output of the upstream sensor 8.

FIG. 7 is a table for describing a map that defines relationships between intake air amounts, sensor outputs, and air-fuel ratios according to Embodiment 3. Note that in FIG. 7, only a portion corresponding to a predetermined region in the vicinity of stoichiometry of the map is shown.

First, in Embodiment 3, the intake air amount is used as a value that has a correlation with the exhaust gas flow rate. In the map shown in FIG. 7, the intake air amount is divided into five regions, and an air-fuel ratio that corresponds to an output is specified for each of the regions.

As shown in FIG. 7, the air-fuel ratio that is determined is set such that, in the region in the vicinity of stoichiometry, with respect to the same output, the larger that the intake air amount region is, the further on the lean side that the value of the air-fuel ratio becomes. In addition, when an output is a value that is on the rich side or the lean side relative to the vicinity of stoichiometry, an air-fuel ratio that is determined in accordance with the output does not change even if the intake air amount changes. On the other hand, variations in accordance with the intake air amount between air-fuel ratios that are determined based on the same output are set so as to increase as the output approaches stoichiometry.

Such a map that defines specific relationships can be set by performing experiments or the like in which, for each downstream sensor 10, an output is detected while changing a flow rate of a sample gas and an air-fuel ratio. The map that is determined is stored in advance in the control apparatus 12.

FIG. 8 is a flowchart for describing a routine of control that the control apparatus 12 executes in Embodiment 3 of the present invention. The processing in FIG. 8 is a subroutine that is executed in a case where detection of the air-fuel ratio was requested.

According to the routine in FIG. 8, when processing to calculate the air-fuel ratio based on the downstream sensor 10 is requested, first, the output of the downstream sensor 10 is acquired (S102). Next, the intake air amount is acquired (S104). In this case, the intake air amount is detected based, for example, on the output of an air flow meter (not illustrated in the drawings) that is arranged in an intake system of the internal combustion engine 2.

Next, an air-fuel ratio is calculated (S106). The air-fuel ratio is calculated according to the map that was stored in advance in the control apparatus 12, in accordance with the sensor output acquired in step S102 and the intake air amount acquired in step S104. Thereafter, the current processing ends.

By the above described processing, an air-fuel ratio that is based on the output of the downstream sensor 10 becomes an air-fuel ratio that takes into account the influence of an oxygen leak in the vicinity of stoichiometry that depends on the intake air amount (exhaust gas flow rate). Consequently, the air-fuel ratio downstream of the three-way catalyst 6 can be detected more accurately, and the precision of control that is based on an air-fuel ratio calculated using the output of the downstream sensor 10 can be improved.

Note that, according to Embodiment 3 a case has been described in which an intake air amount is used as a value having a correlation with the exhaust gas flow rate, and a map that is based on intake air amounts is set. However, the present invention is not limited thereto, and another parameter having a correlation with the exhaust gas flow rate can be used. More specifically, for example, a configuration may be adopted in which a sensor is arranged in the vicinity of the downstream sensor 10 to directly detect the exhaust gas flow rate, and the detected exhaust gas flow rate is used.

Further, in Embodiment 3, a case has been described in which five regions are set with respect to the exhaust gas flow rate, and a map is used in which relationships between each of those regions and outputs and air-fuel ratios are defined. According to this example, in the case of a certain region in which the exhaust gas flow rate is small, an air-fuel ratio is calculated that is on the rich side in comparison to a case where the exhaust gas flow rate is in a region in which the flow rate is greater than in the aforementioned certain region. However, in the present invention the number of regions which the exhaust gas flow rate is divided into is not limited to five, and the exhaust gas flow rate may be divided into two regions or a plurality of regions greater than two.

In addition, a setting may be made so that, as the exhaust gas flow rate increases, the amount by which the air-fuel ratio shifts to the rich side gradually decreases in a stepless manner. More specifically, for example, a configuration may be adopted in which coefficients are established so as to shift the fundamental relationship between the output and the air-fuel ratio of the downstream sensor 10 (see FIG. 4) in accordance with the exhaust gas flow rate, and an air-fuel ratio in accordance with the exhaust gas flow rate is calculated based on a relationship between a coefficient corresponding to the exhaust gas flow rate, an output and an air-fuel ratio.

Further, for example, an air-fuel ratio may be calculated according to the same relationship between the output and the air-fuel ratio at the upstream sensor 8 and the downstream sensor 10, and the output of the downstream sensor 10 or the calculated air-fuel ratio may be corrected in accordance with the exhaust gas flow rate. In this case also, a leak amount can also be taken into account by correcting the output of the downstream sensor 10 or the air-fuel ratio in a stepwise or stepless manner in accordance with the exhaust gas flow rate.

Furthermore, for example, a configuration can also be adopted that combines the above described Embodiment 3 and Embodiment 2, and causes the relationship between the output of the downstream sensor 10 and the air-fuel ratio in the vicinity of stoichiometry to shift to the rich side in accordance with the temperature of the element portion 14 and the exhaust gas flow rate.

Embodiment 4

The system and the air-fuel ratio sensors 8 and 10 of Embodiment 4 have the same configurations as those described with respect to FIG. 1 and FIG. 2. The system of Embodiment 4 performs the similar control as the system of Embodiment 1 except that the relationship between the output and the air-fuel ratio is shifted according to the temperature of the exhaust gas.

The system of the above described Embodiment 2 detects the temperature of the element portion 14 by detecting the impedance of the element portion 14, and varies a shift amount between a case in which the temperature is high and a case in which the temperature is low. This control is performed to counteract the fact that a leak amount increases as the temperature of the downstream sensor 10 rises.

However, the impedance of the element portion 14 deteriorates over time due to use of the downstream sensor 10. Consequently, it is conceivable that an error will arise with respect to the temperature of the element portion 14 calculated based on the impedance. On the other hand, a change in the temperature of an airtight portion (housing 18 or the like) of the air-fuel ratio sensors 8 and 10 also has a correlation to some extent with the exhaust gas temperature, and can also be estimated based on the exhaust gas temperature. Therefore, in Embodiment 4, control is performed to determine the exhaust gas temperature based on the output of an exhaust temperature sensor (not illustrated in the drawings), and set a shift amount in accordance therewith.

However, an airtight portion of the downstream sensor 10 is arranged inside a sensor in the vicinity of a screw portion for attaching the sensor to the exhaust passage 4. Therefore, in this case the detected exhaust gas temperature is not used directly, and instead a value obtained after a moderation process that is adapted to take into account the heat transfer of the exhaust passage and the like or a value obtained after calculating a primary response lag is used as the exhaust gas temperature.

A post-moderation process value $TEXS_i$ is calculated according to the following equation (1).

$$TEXS_i = (TEXS_{i-1} \times n + TEX_i)/(n+1) \quad (1)$$

Where $TEXS_i$ and $TEXS_{i-1}$ represent moderation values of an exhaust gas temperature that were calculated at an $i^{th}$ time (current time) and an $i-1^{th}$ time (previous time), TEX; represents an exhaust gas temperature that was acquired at the time (current time), and n represents the number of moderation times.

Further, a value TEXS_2 obtained after calculating a primary response lag is calculated according to the following equation (2).

$$TEXS\_2 = K(1 - e^{t/T}) \quad (2)$$

Where k represents a gain (constant), e represents an exponential function, t represents time, and T represents a time constant.

FIG. 9 is a view for describing a relationship between the sensor output and air-fuel ratio with respect to respective exhaust gas temperatures according to Embodiment 4 of the present invention. In FIG. 9, the horizontal axis represents the sensor output, and the vertical axis represents the air-fuel ratio. Further, solid lines (d) to (f) represent a relationship between the sensor output and air-fuel ratio at respective temperatures of the exhaust gas, and illustrate a case in which the exhaust gas temperature rises as the relationship moves from the solid line (d) side to the solid line (f) side.

As shown in FIG. 9, among air-fuel ratios determined with respect to the same output that is in a predetermined region in the vicinity of stoichiometry, the air-fuel ratio for the downstream sensor 10 is set so as to become a value that is more on the rich side than the air-fuel ratio for the upstream sensor 8. In addition, as shown by solid lines (f) to (d) in FIG. 9, among air-fuel ratios that correspond to the same output, an air-fuel ratio in a case where the exhaust gas temperature is high (see solid line (f)) is shifted more to the rich side than an air-fuel ratio in a case where the exhaust gas temperature is low (see solid line (d)).

Figures 10, 11:
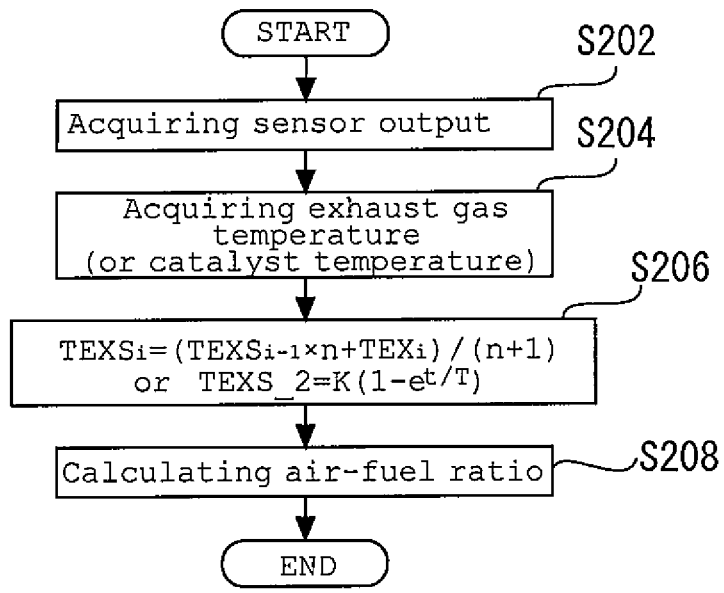
FIG. 10 is a table for describing a map that defines relationships between exhaust gas temperatures, sensor outputs, and air-fuel ratios according to Embodiment 4.
FIG. 11 is a flowchart for describing a routine of control that the control apparatus executes in Embodiment 4 of the present invention.

FIG. 10 is a table for describing a map that defines relationships between exhaust gas temperatures, sensor outputs, and air-fuel ratios according to Embodiment 4. Note that in FIG. 10, only a portion corresponding to a predetermined region in the vicinity of stoichiometry of the map is shown.

According to the map shown in FIG. 10, five temperature regions are defined with respect to the exhaust gas temperature, and a relationship between the output and the air-fuel ratio is defined for each region. According to the map, in the region in the vicinity of stoichiometry, the air-fuel ratio is set so that, with respect to the same output, the higher the temperature region in which the exhaust gas temperature is in, the richer the air-fuel ratio becomes. Further, when the output is biased to a value on the rich side or the lean side, an air-fuel ratio that is determined in accordance with the output shows a constant value and does not change even if the exhaust gas temperature changes. On the other hand, variations in accordance with the exhaust gas temperature between air-fuel ratios that are determined based on the same output are set so as to increase as the output approaches stoichiometry (0).

A map that defines specific relationships between exhaust gas temperatures, outputs, and air-fuel ratio as shown in FIG. 10 can be set by performing an experiment or the like in which a sample gas in which concentrations are varied is supplied under respective exhaust gas temperatures and the outputs are detected. The map that is set is stored in advance in the control apparatus 12.

FIG. 11 is a flowchart for describing a routine of control that the control apparatus 12 executes in Embodiment 4 of the present invention. The processing in FIG. 11 is a subroutine that is executed when there is a request to detect the air-fuel ratio was requested.

According to the routine in FIG. 11, when processing to detect the air-fuel ratio based on the downstream sensor 10 is requested, first, the output of the downstream sensor 10 is acquired (S202). Next, the exhaust gas temperature is acquired (S204). The exhaust gas temperature is detected based on the output of the exhaust temperature sensor arranged in the exhaust passage 4.

Next, with respect to the detected exhaust gas temperature, a value after a moderation process or a value after calculating a primary response lag is calculated (S206). These values are calculated according to the above described equation 1 or equation 2.

Next, an air-fuel ratio is calculated (S208). The air-fuel ratio is calculated based on the map that was stored in advance in the control apparatus 12, in accordance with the sensor output acquired in step S202 and the exhaust gas temperature acquired in step S206. Thereafter, the current processing ends.

As described above, according to Embodiment 4, by estimating to some extent the temperature of an airtight portion of the downstream sensor 10 based on the exhaust gas temperature, an air-fuel ratio that is in accordance with an amount of an oxygen leak of the downstream sensor 10 can be detected without being affected by a deviation in impedance that is caused by deterioration over time of the downstream sensor.

Note that a case in which a value obtained after a moderation process or a value obtained after calculating a primary response lag is used as an exhaust gas temperature has been described according to Embodiment 4. However, according to the present invention a configuration may also be adopted in which an air-fuel ratio is calculated by directly using the exhaust gas temperature, without performing such processing.

Further, in Embodiment 4 a case is described in which a shift amount is set according to an exhaust gas temperature. However, a temperature that is related to the temperature of the airtight portion is not limited to the exhaust gas temperature. For example, a configuration may be adopted in which a shift amount is set according to the catalyst temperature of the three-way catalyst. Further, the exhaust gas temperature may be a temperature that is estimated based on a control parameter of the internal combustion engine 2.

In addition, in Embodiment 4, a case has been described in which five regions are set with respect to the exhaust gas temperature, and a map is used in which relationships between each of those regions and outputs and air-fuel ratios are defined. According to this example, in the case of a certain region in which the exhaust gas temperature is high, an air-fuel ratio is calculated that is on the rich side in comparison to a case where the exhaust gas temperature is in a region in which the temperature is lower than in the aforementioned certain region. However, in the present invention the number of regions with respect to the exhaust gas temperature is not limited to five, and the number of regions can be set as appropriate.

Furthermore, a setting may be made so that, as the exhaust gas temperature rises, the amount by which the air-fuel ratio shifts to the rich side gradually increases in a stepless manner. More specifically, for example, a configuration may be adopted in which coefficients are established so as to shift the fundamental relationship between the output and the air-fuel ratio of the downstream sensor 10 (see FIG. 4) in accordance with the exhaust gas temperature, and an air-fuel ratio in accordance with the exhaust gas temperature is calculated based on a relationship between a coefficient corresponding to the exhaust gas temperature, an output and an air-fuel ratio.

Further, according to the present invention, for example, an air-fuel ratio may be calculated according to the same relationship between the output and the air-fuel ratio at the upstream sensor 8 and the downstream sensor 10, and the output of the downstream sensor 10 or the calculated air-fuel ratio may be corrected in accordance with the exhaust gas temperature. In this case also, a leak amount can be taken into account by correcting the output of the downstream sensor 10 or the air-fuel ratio in a stepwise or stepless manner in accordance with the exhaust gas temperature.

Furthermore, according to Embodiment 2 a case was described in which the air-fuel ratio is shifted according to the temperature of the element portion 14, according to Embodiment 3 a case was described in which the air-fuel ratio is shifted according to the exhaust gas flow rate, and according to Embodiment 4 a case was described in which the air-fuel ratio is shifted according to the exhaust gas temperature. The present invention is not limited to a configuration in which the aforementioned control operations are performed separately and independently, and a configuration may be adopted that detects an air-fuel ratio by combining two of, or all of, the aforementioned control operations.

It is to be understood that even when the number, quantity, amount, range or other numerical attribute of an element is mentioned in the above description of the embodiments, the present invention is not limited to the mentioned numerical attribute unless it is expressly stated or theoretically defined. Further, structures and the like described in conjunction with the embodiments are not necessarily essential to the present invention unless expressly stated or theoretically defined.

DESCRIPTION OF REFERENCE NUMERALS 2 internal combustion engine
4 exhaust passage
4a wall face of exhaust passage
6 three-way catalyst
8 upstream sensor (air-fuel ratio sensor)
10 downstream sensor (air-fuel ratio sensor)
12 control apparatus
14 element portion
16 cover
18 housing
20 ceramic
22 talc material
24 glass

The invention claimed is:

1. A control apparatus configured to perform air-fuel ratio feedback control of an air-fuel ratio of an internal combustion engine, said apparatus including an air-fuel ratio detection device, wherein the detection device is configured to:
   detect an output of a downstream sensor that is a limiting-current type air-fuel ratio sensor that is arranged at a downstream side of a catalyst in an exhaust passage of the internal combustion engine; and
   calculate an air-fuel ratio of an exhaust gas at the downstream side of the catalyst in accordance with an output of the downstream sensor; wherein:
   in a case where the output of the downstream sensor is within a predetermined range that includes an output in accordance with a theoretical air-fuel ratio,
   a relationship between the output of the downstream sensor and the air-fuel ratio that is calculated by the detection device is a relationship that is shifted more to a rich side relative to a correspondence relationship between an output of an upstream sensor which is a similar sensor to the downstream sensor and which is arranged at an upstream side of the catalyst in the exhaust passage of the internal combustion engine and an air-fuel ratio on the upstream side of the catalyst,
   wherein the detection device is further configured to:
   detect or estimate a temperature of an element portion of the downstream sensor;
   detect or estimate an exhaust gas flow rate that is discharged into the exhaust passage of the internal combustion engine; or
   detect or estimate a temperature of an exhaust gas that is discharged into the exhaust passage of the internal combustion engine,
   wherein:
   when the detection device is configured to detect or estimate the temperature of the element portion and also when the output of the downstream sensor is within the predetermined range, the relationship between the output of the downstream sensor and the air-fuel ratio that is calculated based on the output is a relationship that, when the temperature of the element portion is high, is shifted more to the rich side than when the temperature of the element portion is low, when the detection device is configured to detect or estimate the exhaust gas flow rate and also when the output of the downstream sensor is within the predetermined range, the relationship between the output of the downstream sensor and an air-fuel ratio that is calculated based on the output is a relationship that, when the exhaust gas flow rate is small, is shifted more to the rich side than when the exhaust gas flow rate is large, and when the detection device is configured to detect or estimate the exhaust gas temperature and also when the output of the downstream sensor is within the predetermined range, the relationship between the output of the downstream sensor and an air-fuel ratio that is calculated based on the output is a relationship that, when the exhaust gas temperature is high, is shifted more to the rich side than when the exhaust gas temperature is low; and wherein the control apparatus is configured to control the air-fuel ratio of the internal combustion engine based on the calculated air-fuel ratio.

2. A control apparatus configured to perform air-fuel ratio feedback control of an air-fuel ratio of an internal combustion engine, said apparatus including an air-fuel ratio detection device, wherein the detection device is configured to:

detect an output of a downstream sensor that is a limiting-current type air-fuel ratio sensor that is arranged at a downstream side of a catalyst in an exhaust passage of an internal combustion engine; and calculate an air-fuel ratio of an exhaust gas at the downstream side of the catalyst in accordance with an output of the downstream sensor; wherein:

in a case where the output of the downstream sensor is within a predetermined range that includes an output in accordance with a theoretical air-fuel ratio, a relationship between the output of the downstream sensor and the air-fuel ratio that is calculated by the detection device is a relationship that is shifted more to a rich side relative to a correspondence relationship between an output of an upstream sensor which is a similar sensor to the downstream sensor and which is arranged at an upstream side of the catalyst in the exhaust passage of the internal combustion engine, and an air-fuel ratio on the upstream side of the catalyst, wherein the detection device is further configured to:
calculate an air-fuel ratio according to the output of the downstream sensor based on a similar relationship to the correspondence relationship of the upstream sensor; and correct the calculated air-fuel ratio so that the calculated air-fuel ratio becomes an air-fuel ratio on the rich side when the output of the downstream sensor is within the predetermined range;

wherein the detection device is further configured to:
detect or estimate a temperature of an element portion of the downstream sensor;

detect or estimate an exhaust gas flow rate that is discharged into the exhaust passage of the internal combustion engine; or detect or estimate a temperature of an exhaust gas that is discharged into the exhaust passage of the internal combustion engine, wherein:
when the detection device is configured to detect or estimate the temperature of the element portion and also when the temperature of the element portion is high, the detection device is also configured to correct the air-fuel ratio more to the rich side than when the temperature of the element portion is low, when the detection device is configured to detect or estimate the exhaust gas flow rate and also when the exhaust gas flow rate is small, the detection device is also configured to correct the air-fuel ratio more to the rich side than when the exhaust gas flow rate is large, and when the detection device is configured to detect or estimate the exhaust gas temperature and also when the exhaust gas temperature is high, the detection device is also configured to correct the air-fuel ratio more to the rich side than when the exhaust gas temperature is low; and wherein the control apparatus is configured to control the air-fuel ratio of the internal combustion engine based on the calculated air-fuel ratio.

3. A control apparatus configured to perform air-fuel ratio feedback control of an air-fuel ratio of an internal combustion engine, said apparatus including an air-fuel ratio detection device, wherein the detection device is configured to:

detect an output of a downstream sensor that is a limiting-current type air-fuel ratio sensor that is arranged at a downstream side of a catalyst in an exhaust passage of an internal combustion engine; and calculate an air-fuel ratio of an exhaust gas at the downstream side of the catalyst in accordance with an output of the downstream sensor; wherein:

in a case where the output of the downstream sensor is within a predetermined range that includes an output in accordance with a theoretical air-fuel ratio, a relationship between the output of the downstream sensor and the air-fuel ratio that is calculated by the detection device is a relationship that is shifted more to a rich side relative to a correspondence relationship between an output of an upstream sensor which is a similar sensor to the downstream sensor and which is arranged at an upstream side of the catalyst in the exhaust passage of the internal combustion engine, and an air-fuel ratio on the upstream side of the catalyst, wherein the detection device is further configured to:
correct the output of the downstream sensor to a value on the rich side when the output is within the predetermined range; and calculate an air-fuel ratio based on a similar relationship to the correspondence relationship of the upstream sensor according to the corrected output;

wherein the detection device is further configured to:
detect or estimate a temperature of an element portion of the downstream sensor;

detect or estimate an exhaust gas flow rate that is discharged into the exhaust passage of the internal combustion engine; or detect or estimate a temperature of an exhaust gas that is discharged into the exhaust passage of the internal combustion engine, wherein:
when the detection device is configured to detect or estimate the temperature of the element portion and also when the temperature of the element portion is high, the detection device is also configured to correct the air-fuel ratio more to the rich side than when the temperature of the element portion is low, when the detection device is configured to detect or estimate the exhaust gas flow rate and also when the exhaust gas flow rate is small, the detection device is also configured to correct the air-fuel ratio more to the rich side than when the exhaust gas flow rate is large, and when the detection device is configured to detect or estimate the exhaust gas temperature and also when the exhaust gas temperature is high, the detection device is also configured to correct the air-fuel ratio more to the rich side than when the exhaust gas temperature is low; and wherein the control apparatus is configured to control the air-fuel ratio of the internal combustion engine based on the calculated air-fuel ratio.

4. A control apparatus configured to perform air-fuel ratio feedback control of an air-fuel ratio of an internal combustion engine, said apparatus including an air-fuel ratio detection method that detects an output of a downstream sensor that is a limiting-current type air-fuel ratio sensor that is arranged at a downstream side of a catalyst in an exhaust passage of an internal combustion engine, and calculates an air-fuel ratio of an exhaust gas at the downstream of the catalyst, wherein:

in a case where the output of the downstream sensor is within a predetermined range that includes an output corresponding to a theoretical air-fuel ratio, a relationship between the output of the downstream sensor and an air-fuel ratio that is calculated in accordance with the output is a relationship that is shifted more to a rich side relative to a correspondence relationship between an output of an upstream sensor which is a similar sensor to the downstream sensor and which is arranged at an upstream side of a catalyst in an exhaust passage of an internal combustion engine and an air-fuel ratio, wherein the method detects or estimates:

a temperature of an element portion of the downstream sensor;

an exhaust gas flow rate that is discharged from the exhaust passage of the internal combustion engine; or a temperature of an exhaust gas that is discharged into the exhaust passage of the internal combustion engine, wherein:

when the method detects or estimates the temperature of the element portion and also when the output of the downstream sensor is within the predetermined range, the method makes an air-fuel ratio that is calculated according to the output of the downstream sensor, when temperature of the element portion is high, a value that is more on the rich side than an air-fuel ratio that is calculated according to an output of a same value as the output when the temperature of the element portion is low, when the method detects or estimates the exhaust gas flow rate and also when the output of the downstream sensor is within the predetermined range, the method makes an air-fuel ratio that is calculated according to the output of the downstream sensor, when the exhaust gas flow rate is small, a value that is more on a rich side than an air-fuel ratio that is calculated according to an output of a same value as the output when the exhaust gas flow rate is large, and when the method detects or estimates the exhaust gas temperature and also when the output of the downstream sensor is within the predetermined range, the method makes an air-fuel ratio according to the output of the downstream sensor, when the exhaust gas temperature is high, a value that is more on a rich side than an air-fuel ratio that is calculated according to an output of a same value as the output in a case where the exhaust gas temperature is low; and wherein the control apparatus is configured to control the air-fuel ratio of the internal combustion engine based on the calculated air-fuel ratio.

* * * * *